J. S. HOFER & J. P. STAHL.
HUSKING DEVICE.
APPLICATION FILED AUG. 8, 1911.
1,026,585.
Patented May 14, 1912.
3 SHEETS—SHEET 1.
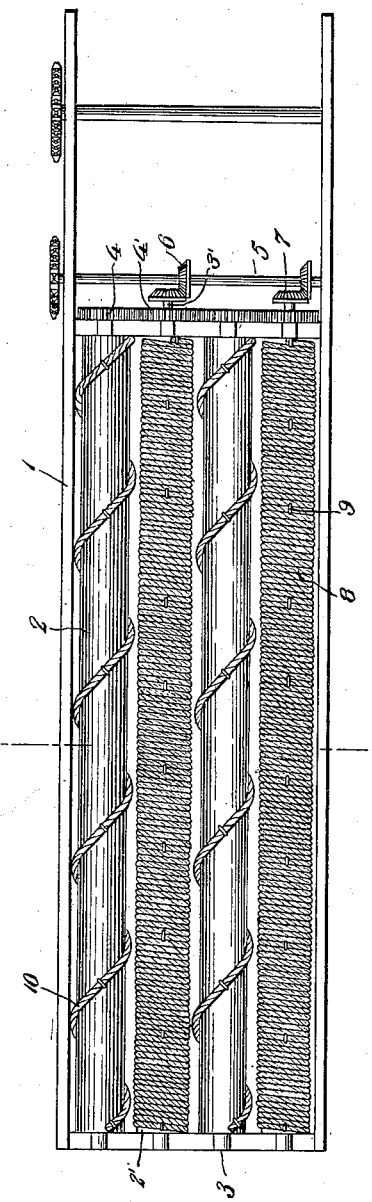
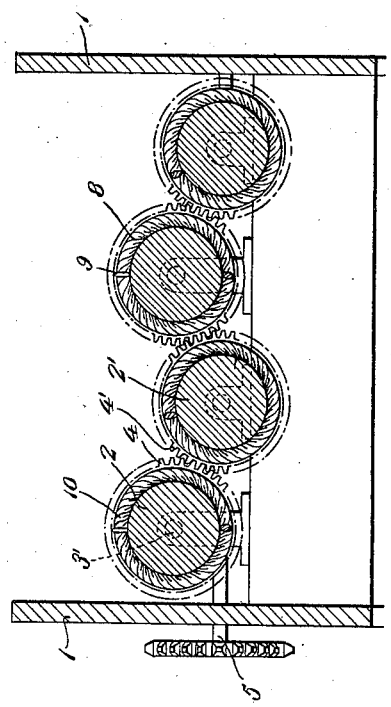
Witnesses
J. H. Crawford
Wm Bagger
Inventor
Joshua S. Hofer,
Jacob P. Stahl,
By Victor J. Evans
Attorney J. S. HOFER & J. P. STAHL.
HUSKING DEVICE.
APPLICATION FILED AUG. 8, 1911.
1,026,585.
Patented May 14, 1912.
3 SHEETS—SHEET 2.
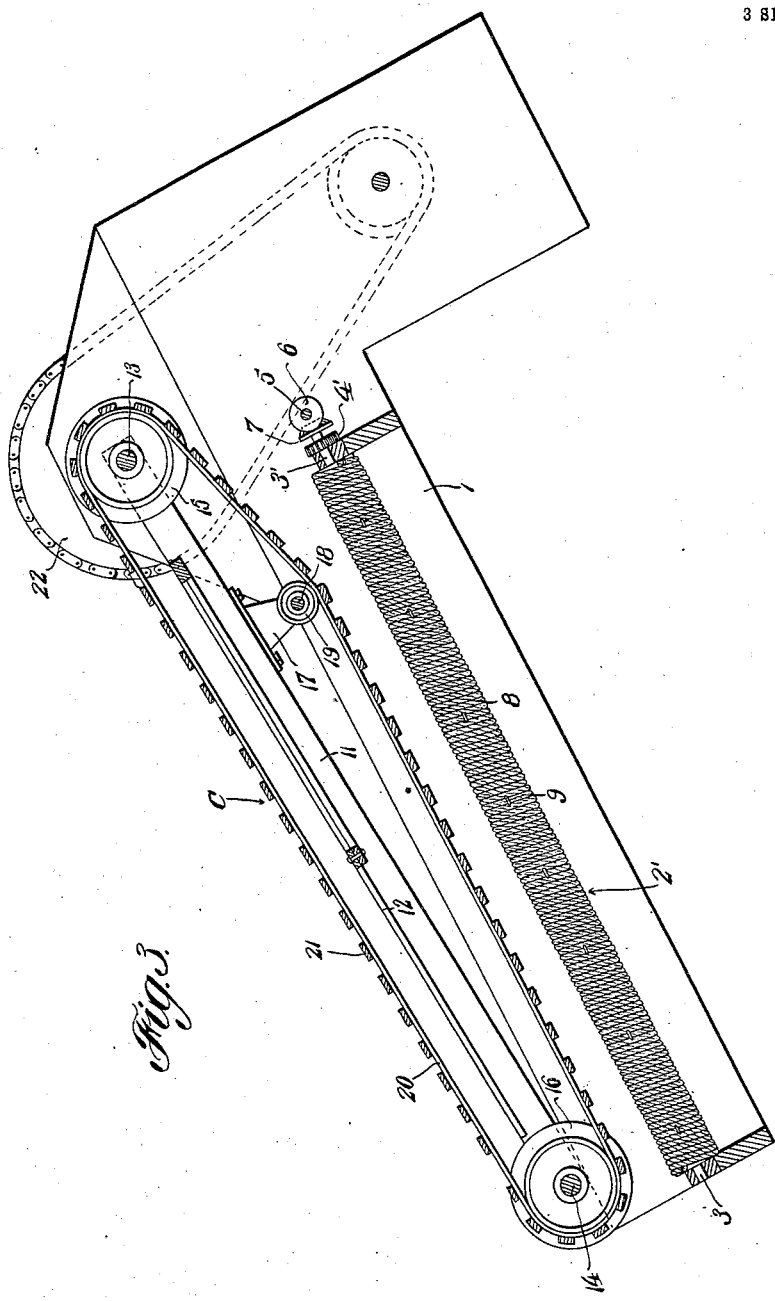
Witnesses
J. H. Crawford
Wm Bagger
Inventor
Joshua S. Hofer,
Jacob P. Stahl,
By Victor J. Evans
Attorney J. S. HOFER & J. P. STAHL.
HUSKING DEVICE.
APPLICATION FILED AUG. 8, 1911.
1,026,585.
Patented May 14, 1912.
3 SHEETS—SHEET 3.
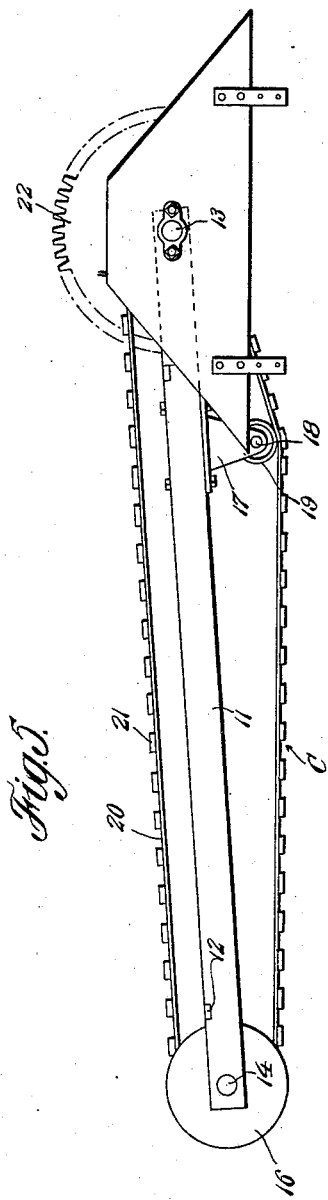
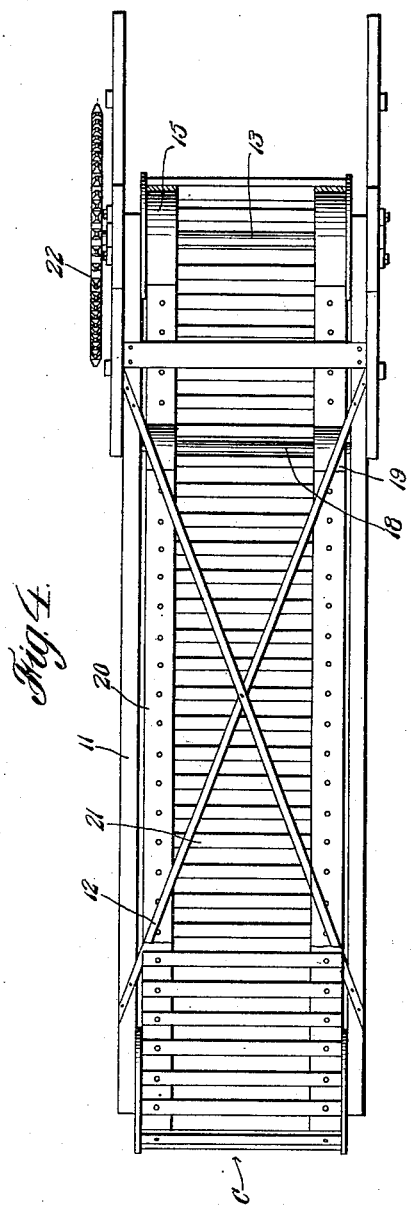
Witnesses
J. H. Crawford.
Wm Bagger
Inventor
Joshua S. Hofer,
Jacob P. Stahl,
By Victor J. Evans
Attorney

UNITED STATES PATENT OFFICE.

JOSHUA S. HOFER, OF BRIDGEWATER, AND JACOB P. STAHL, OF HURON, SOUTH DAKOTA; SAID STAHL ASSIGNOR TO SAID HOFER.

HUSKING DEVICE.

1,026,585.  Specification of Letters Patent.  Patented May 14, 1912.

Application filed August 8, 1911. Serial No. 643,018.

*To all whom it may concern:*

Be it known that we, JOSHUA S. HOFER and JACOB P. STAHL, citizens of the United States, residing at Bridgewater and Huron, respectively, in the counties of Hutchinson and Beadle, respectively, and State of South Dakota, have invented new and useful Improvements in Husking Devices, of which the following is a specification.

This invention relates to corn harvesting and husking machines of the type in which the ears of corn are picked or snapped from the stalks in the field by the action of suitable picking or snapping devices, the ears being subsequently conveyed to the husking device comprising a plurality of rolls arranged in pairs so as to detach the husk from the ears, the latter being subsequently discharged into a suitable receptacle, such as the box of a wagon traveling alongside the machine or in some other receptacle provided for the purpose.

The present invention which, although the principle thereof is applicable to various types and standard makes of machines, is particularly designed to be used upon the Deering type of corn harvester or corn picker, refers particularly to the husk stripping mechanism whereby the husks of the ears shall be unfailingly gripped and detached without regard to the condition of the corn, whether the latter be dry or moist.

A further object of the invention is to provide a simple and efficient husking mechanism which shall be lighter and more compact than the husking mechanism generally employed in which husking rollers of cast iron or other metal are usually employed.

A still further object of the invention is to provide a simple and improved retarding device for retarding the ears as the latter pass over the husking device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a plan view showing a set of husking rollers constructed in accordance with the invention. Fig. 2 is a transverse sectional view taken on the line 2—2 in Fig. 1. Fig. 3 is a longitudinal vertical sectional view of the husking device including the retarder. Fig. 4 is a top plan view of the retarder frame, the endless member constituting the retarder having been partly broken away. Fig. 5 is a side elevation of the retarding device detached.

Corresponding parts in the several figures are denoted by like characters of reference.

The husking device comprises a frame 1 in which the rollers 2, 2' are supported for rotation. In the present invention the husking rollers are made of wood, said wooden rollers being mounted upon shafts or journals 3, 3' for which bearings are provided at the upper and lower ends of the frame 1, the rollers 2, 2' being supported in an inclined position.

In corn picking or harvesting machines of various types now in use, it is customary to employ three or more sets or pairs of husking rollers, but we believe that with the improved construction which is to be hereinafter described, one or at most two sets or pairs of husking rollers will be amply sufficient to do the work required. Therefore, while not limiting ourselves to the use of any stated number, we have in the accompanying drawings shown only two pairs of rollers, which is regarded as amply sufficient for every purpose. However, when the invention is applied to machines in present use, we may find it desirable to use additional husking rollers in order to save the expense of rebuilding which would probably amount to more than the cost of installing more rollers than would be actually necessary to perform the work required. As is customary in devices of this kind, one roller, 2, of each pair is disposed in a plane somewhat above that of its mate 2'. Each pair of rollers is provided with intermeshing gears 4, 4', and the several sets of rollers are driven from a suitable driven shaft 5 having bevel pinions 6 meshing with bevel pinions 7 that are associated with the rollers 2'.

The rollers, as previously stated, are made of wood, and one roller of each pair, preferably the lower one, 2', is wound from end to end with suitable tightly-twisted fibrous material, such as ordinary Manila rope 8, the same being secured to the rollers at and intermediate the ends of the latter by means of clips or staples 9 or fastening devices of any description. The mating roller 2 of each pair is likewise wound spirally with a tightly twisted rope of fibrous material, such as ordinary Manila rope 10, the individual coils being, however, spaced widely apart to present the appearance of a corkscrew. By properly proportioning the intermeshing gears 4, 4', the rollers 2 will be rotated at a speed somewhat exceeding that of the rollers 2'. The retarding device comprises a frame composed of side members 11 connected together and spaced apart by means of diagonal braces 12, said side members being provided adjacent to their upper and lower ends, respectively, with bearings for shafts 13 and 14 carrying flanged wheels 15, 16. Brackets 17 upon the outer sides of the side members 11 afford bearings for a transverse shaft 18 having guide pulleys 19. Endless belts 20, which are guided over the flanged wheels 15, 16 and the guide pulleys 19, are connected together by transverse slats 21. The shaft 13 at the upper end of the frame is extended beyond the side members 11 to form journals, whereby the retarder frame is pivotally associated with the frame 1 of the husking device. Said shaft 13 is also provided with a sprocket wheel 22 adapted to receive motion by means of a belt or band from a driven shaft of the machine to which the invention is applied.

In the operation of the invention the ears of corn having been detached from the stalks are conveyed by an elevator of suitable construction to the husking device and are deposited upon the upper ends of the husking rollers which are driven from the shaft 5, as described. The retarder frame is supported in such a manner that the lower lead of the endless carrier C composed of the belts 20 and slats 21 will be supported upon the upper faces of the husking rollers, where it rests lightly. It will be seen that the supporting shaft 13 is disposed in a plane above that of the shaft 18, thus causing that portion of the lower lead of the carrier which is disposed between the guide wheels 18 and the flanged wheels 15 on the shafts 19 and 13, respectively, to diverge upwardly from the receiving ends of the rollers, thereby facilitating the feeding of the ears of corn to the husking rollers. It follows that ears of corn deposited upon the husking rollers will gravitate downwardly over the latter, the husks being, meanwhile, engaged by the fibrous coverings of said rollers. The lower lead of the endless member of the retarding device which engages the husking rollers moves in an upward direction, thus retarding the passage of the ears over the husking rollers and thus giving ample time for the said husking rollers to perform the function assigned to them, of stripping the husks from the ears, in a very thorough and efficient manner.

By the improvement of the present invention, the husking rollers are covered with fibrous material which will cause the fibers of the husks to instantly adhere to the rollers, which latter, getting a firm grip upon the husks, will unfailingly strip the latter completely from the ears, leaving the latter in as clean and as perfect condition as if husked by hand. This has been demonstrated by tests of a severe nature. It is also found that the peculiar manner of winding the fibrous material upon the rollers, as herein described, is conducive to the best results, because the corkscrew strand wound about the one roller will positively force the husks into engagement with the closely wound covering upon the other roller, thus promoting the efficiency of operation.

It is obvious, that the improved rollers being made of wood, they are much lighter than the cast iron rollers heretofore employed, and owing to this fact, as well as to the face that fewer rollers may be used, a great saving in weight is effected, and the draft of the machine is correspondingly lightened. The cost of construction and installation is also materially reduced. It will, furthermore, be seen that owing to the reduction in the number of rollers, an elevating device of small dimensions may be used, thereby effecting a further saving in weight as well as in the cost of construction. The husk stripping, as well as the retarding, device is simple in construction and has been found thoroughly efficient for the purpose for which it is provided.

In the foregoing description it has been stated that fibrous material, such as ordinary Manila rope, may be used upon the husking rollers, but it is desired to be understood that no limitation is made to this particular material, inasmuch as any fibrous material that will cause the fibers of the husks to adhere thereto, thereby causing the husks to be instantly and tightly gripped by the rollers, may be used.

Having thus described the invention, what is claimed as new, is:—

1. In a device of the class described, a pair of husking rollers, one of said rollers being closely wound from end to end with tightly twisted fibrous material, and the other of said rollers being spirally wound with similar tightly twisted fibrous material, the individual coil being spaced in corkscrew fashion.

2. In a device of the class described, a pair of oppositely driven cylindrical husking rollers, one of said rollers being provided with a strand of covering material closely wound thereon from end to end and attached firmly to the roller at and intermediate the ends of the latter, and the other roller being provided with a spirally wound strand of tightly twisted material wound thereupon from end to end in corkscrew fashion and attached securely to the roller adjacent to and intermediate the ends of the latter.

3. In a device of the class described, a husking device comprising a plurality of rollers supported for rotation in an inclined plane, in combination with a retarding device comprising a pivotally supported frame, an endless retarding member guided upon said frame, said retarding member including a lead which is opposed to the upper faces of the husking rollers, a portion of said lead being guided at an angle to the remaining portion of the lead to diverge from the receiving ends of the husking rollers, and means for so driving the retarding member that the lead opposed to the husking rollers will move in the direction of the receiving ends of said rollers.

In testimony whereof we affix our signatures in presence of two witnesses.

JOSHUA S. HOFER.
JACOB P. STAHL.

Witnesses:
WILLIAM A. LYNCH,
GEORGE W. LONGSTAFF.

Copies of this patent may be obtained for five cents each, by addressing the "Commissioner of Patents, Washington, D. C."